United States Patent
Kojima et al.

(10) Patent No.: US 7,992,547 B2
(45) Date of Patent: Aug. 9, 2011

(54) MULTIPLE GAS FUEL DELIVERY SYSTEM

(75) Inventors: Hiroaki Kojima, Wako (JP); Haruo Tsusaka, Wako (JP); Masanori Fujinuma, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 328 days.

(21) Appl. No.: 12/463,081

(22) Filed: May 8, 2009

(65) Prior Publication Data
US 2009/0277419 A1 Nov. 12, 2009

(30) Foreign Application Priority Data
May 8, 2008 (JP) ................................ 2008-122316

(51) Int. Cl.
*F02M 37/02* (2006.01)
*F02M 37/00* (2006.01)

(52) U.S. Cl. ........................ 123/515; 123/575

(58) Field of Classification Search .................. 123/575, 123/576, 577, 578, 590, 527, 525, 515, DIG. 7; 48/184, 189.6
See application file for complete search history.

(56) References Cited

U.S. PATENT DOCUMENTS
4,306,532 A * 12/1981 Camacho ..................... 123/527
2006/0236986 A1 10/2006 Fujisawa et al.

FOREIGN PATENT DOCUMENTS
JP 2006-329041 A 12/2006
* cited by examiner

*Primary Examiner* — Mahmoud Gimie
(74) *Attorney, Agent, or Firm* — Westerman, Hattori, Daniels & Adrian, LLP

(57) ABSTRACT

In a multiple gas fuel delivery system for interchangeably supplying a plurality of gas fuels having different supply pressures to an internal combustion engine, at least a pair of fuel passages extend from a gas fuel inlet (6a) to a fuel ejection nozzle (12) for delivering the gas fuel to a carburetor, and are provided with respective metering jets (13, 14). One of the fuel passages is provided with a pressure responsive valve (15) that communicates only the first metering jet (14) for delivering the fuel gas to the carburetor when a gas fuel of a relatively high pressure is used, and communicates both the first and second metering jets (13, 14) for delivering the fuel gas to the carburetor when a gas fuel of a relatively low pressure is used. Therefore, a flow switching valve is not required, and the passage structure can be simplified. Also, the pressure responsive valve (15) is actuated by the pressure of the fuel, and no manual selection is required when a different gas fuel is selected.

3 Claims, 7 Drawing Sheets

US 7,992,547 B2

MULTIPLE GAS FUEL DELIVERY SYSTEM

TECHNICAL FIELD

The present invention relates to a multiple gas fuel delivery system for delivering a plurality of gas fuels to an internal combustion engine in an interchangeable manner.

BACKGROUND OF THE INVENTION

Some of the existing internal combustion engines are designed to use liquid petroleum gas (LPG) such as propane gas and butane gas for fuel. Such gas fuels generally have different calorific values or stoichiometric requirements, and are supplied at variously different pressures. The pressure of the gas that is actually delivered to the engine is controlled by a pressure regulator to a pressure that suits the particular gas fuel that is to be used.

It was proposed in Japanese patent laid open publication No. 2006-329041 (patent document 1) to provide a pair of metering jets that are configured for propane gas and butane gas, respectively, in a carburetor, and use a cam operated switching valve to conduct the gas fuel to one of the metering jets depending on the kind of the gas fuel that is being used. This allows a single carburetor to be adapted to two different kinds of gas fuel simply by operating the switching valve. However, the carburetor is required to be equipped with a switching valve, two flow control valves and two metering jets. Therefore, the cost of the carburetor necessarily increases. Furthermore, the complexity and size of the carburetor increase, and this is highly undesirable particularly in small engines.

BRIEF SUMMARY OF THE INVENTION

In view of such problems of the prior art, a primary object of the present invention is to provide a multiple gas flow delivery system which is reliable in operation, easy to use and economical to manufacture.

According to the present invention, such an object can be accomplished at least partly by providing a multiple gas fuel delivery system for interchangeably supplying a plurality of gas fuels having different supply pressures to an internal combustion engine, comprising: a gas fuel inlet for receiving a supply of gas fuel; a gas flow control valve for metering a gas fuel flow from the gas fuel inlet according to a demand from an engine; a fuel ejection nozzle for delivering the fuel metered by the gas flow control valve to the engine; a first fuel delivery passage including a first metering jet and extending between the gas flow control valve and the fuel ejection nozzle; and a second fuel delivery passage including a second metering jet and a pressure responsive valve and extending between the gas flow control valve and the fuel ejection nozzle in parallel with the first fuel delivery passage, the pressure responsive valve selectively communicating the second fuel delivery passage depending on a pressure of the gas fuel supplied to the gas fuel inlet.

Therefore, any selected gas fuel can be supplied to a single, same gas fuel inlet, and the user is not required to take any action. Therefore, the connection to a gas source can be simplified, and there is no difficulty in operating the system. Furthermore, the same gas flow control valve may be used for different gas fuels, and this simplifies and economizes the structure of the system.

According to a preferred embodiment of the present invention, the system further comprises a carburetor that includes an intake bore into which the fuel injection nozzle projects, and the gas flow control valve comprises an atmospheric chamber, a negative pressure chamber communicating with the fuel ejection nozzle, a diaphragm separating the negative pressure from the atmospheric chamber and a valve member that meters the gas fuel flow by being actuated by the diaphragm.

However, the present invention can be used not only with a carburetor, but may also be used with a throttle body, a fuel injection system or any other fuel supply system for an internal combustion engine.

According to a certain aspect of the present invention, the pressure responsive valve comprises a pressurizing chamber communicating with the gas fuel inlet, a controlled chamber communicating with the negative pressure chamber of the gas flow control valve and fuel ejection nozzle, a diaphragm separating the controlled chamber from the pressurizing chamber and a valve member that selectively establish communication between the negative pressure chamber of the gas flow control valve and fuel ejection nozzle by being actuated by the diaphragm.

Although using a diaphragm is preferred as an actuator for the valve member, it is all within the purview of the present invention to use other equivalent means such as pistons and other pressure responsive members.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
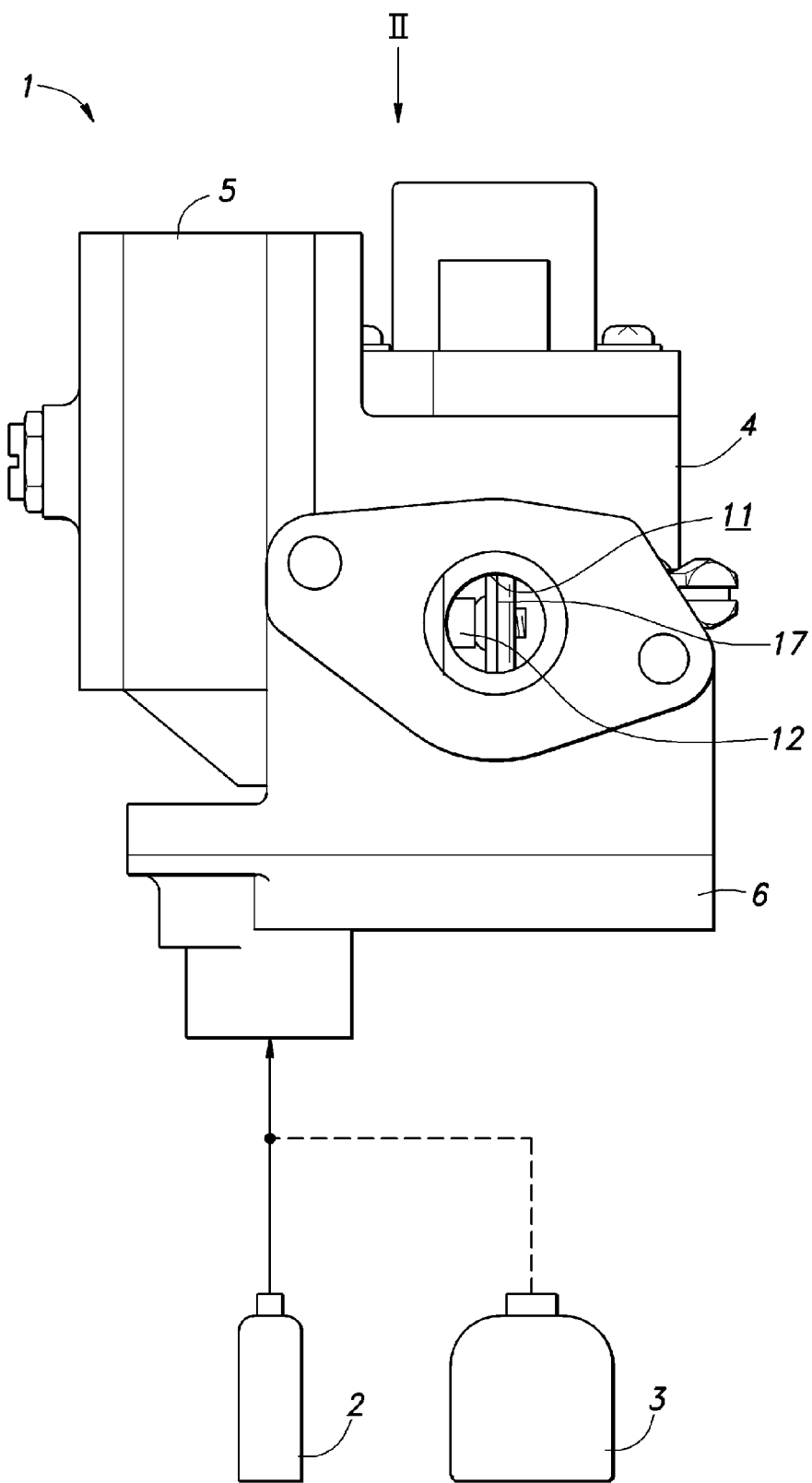
FIG. 1 is a front view of a dual gas fuel delivery system embodying the present invention.

Referring to FIG. 1, a multiple gas fuel delivery system 1 embodying the present invention can be connected to a butane gas cylinder 2 storing butane gas and supplying the butane gas at a relatively high pressure by using an appropriate pressure regulator and a propane gas cylinder 3 storing propane gas and supplying the propane gas at a relatively low pressure by using an appropriate pressure regulator, interchangeably. These gas fuels may be supplied at pressures according to the stoichiometric requirements of the particular gas fuels. The illustrated embodiment uses butane gas and propane gas interchangeably, but it is only exemplary, and other gases and three or more gasses may be interchangeably used by appropriately modifying the illustrated structure without departing from the spirit of the present invention.

Figure 2:
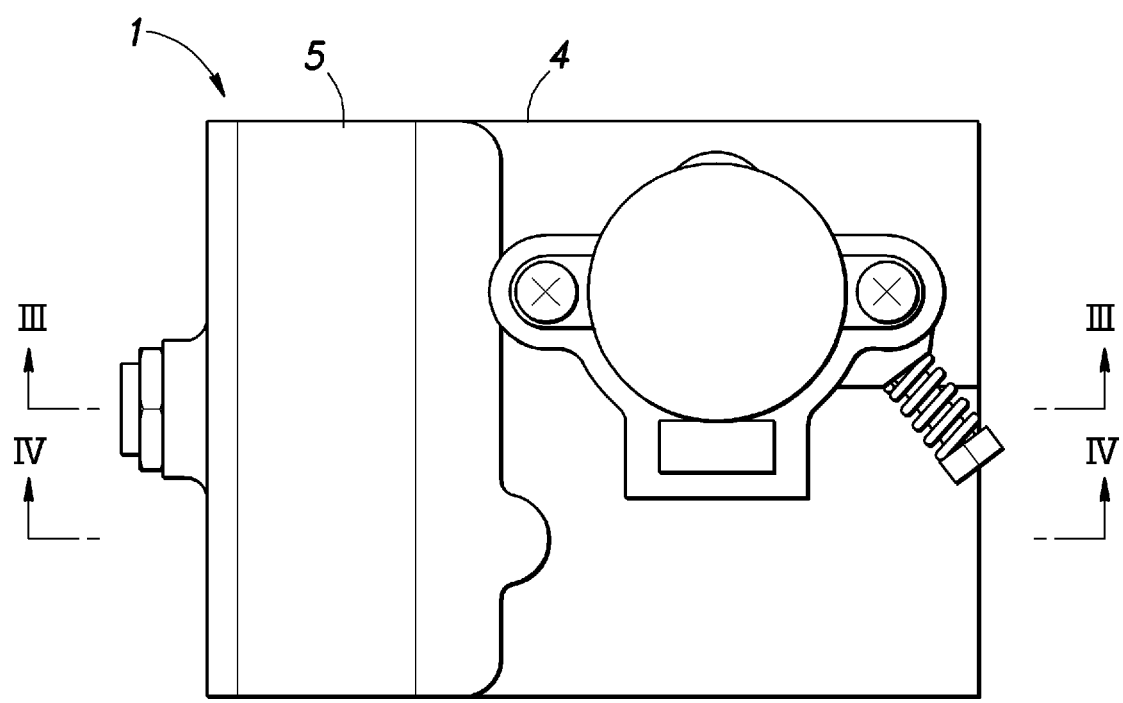
FIG. 2 is a plan view of the dual gas fuel delivery system as seen in the direction indicated by arrow II in FIG. 1.
Figure 3:
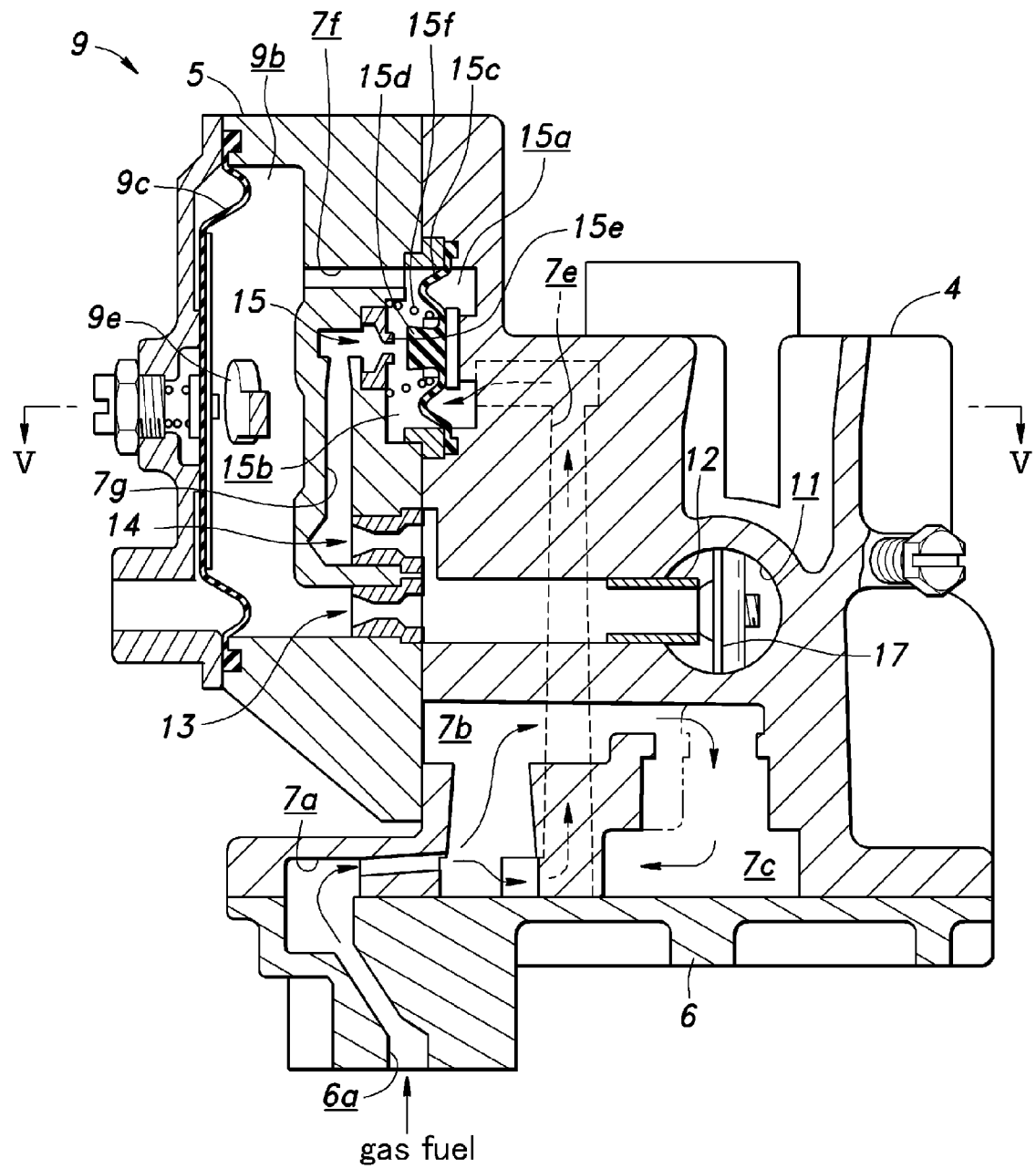
FIG. 3 is a sectional view taken along line III-III of FIG. 2.

Referring to FIGS. 1 to 3, the multiple gas fuel delivery system 1 comprises a main body 4 incorporated with a carburetor, a gas flow controller block 5 attached to a left side of the main body as seen in FIG. 3 and a piping block 6 attached to a lower side of the main body 4 in the manner of a cover as seen in FIG. 3. These component blocks are attached to each other by using threaded bolts among other possibilities. It should be noted that the cross sectional view of FIG. 3 is taken along different planes in various parts thereof.

The piping block 6 is provided with a gas fuel inlet 9a opening out on an exterior surface thereof which is formed with a female thread so that a pipe leading to the gas cylinder 2 or 3 may be connected thereto. The gas fuel inlet 6a extends to an interface between the piping block 6 and main body 4 where it communicates with a first passage 7a formed in the main body 4.

Figure 4:
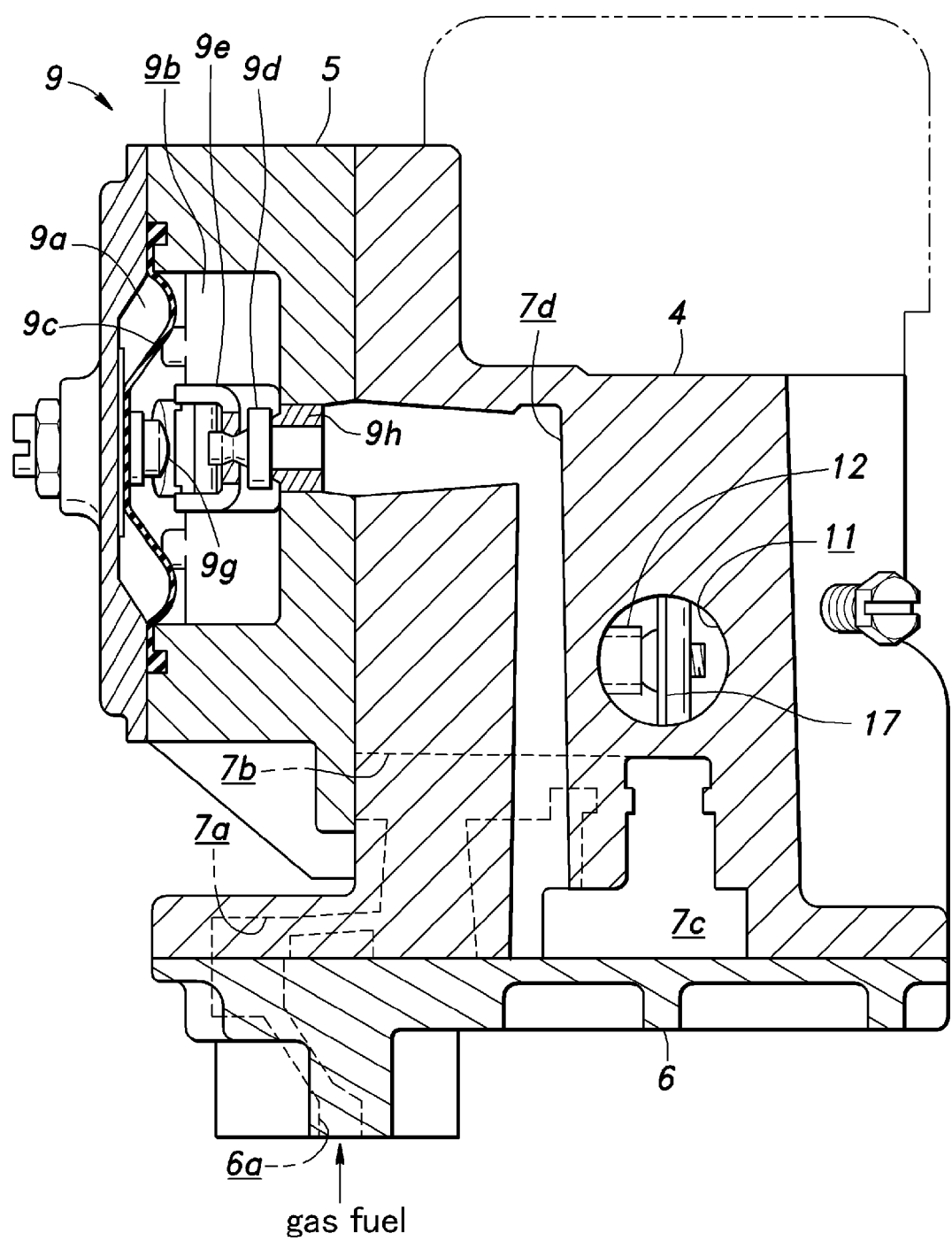
FIG. 4 is a sectional view taken along line IV-IV of FIG. 2.

Referring to FIGS. 3 and 4, the main body 4 is internally provided with a first branch chamber 7b communicating with the first passage 7a, and a second branch chamber 7c communicating with the first branch chamber 7b. The second branch chamber 7c communicates with a second passage 7d that extends to a middle part of the interface between the main body 4 and gas flow controller block 5 (FIG. 4).

Figure 5:
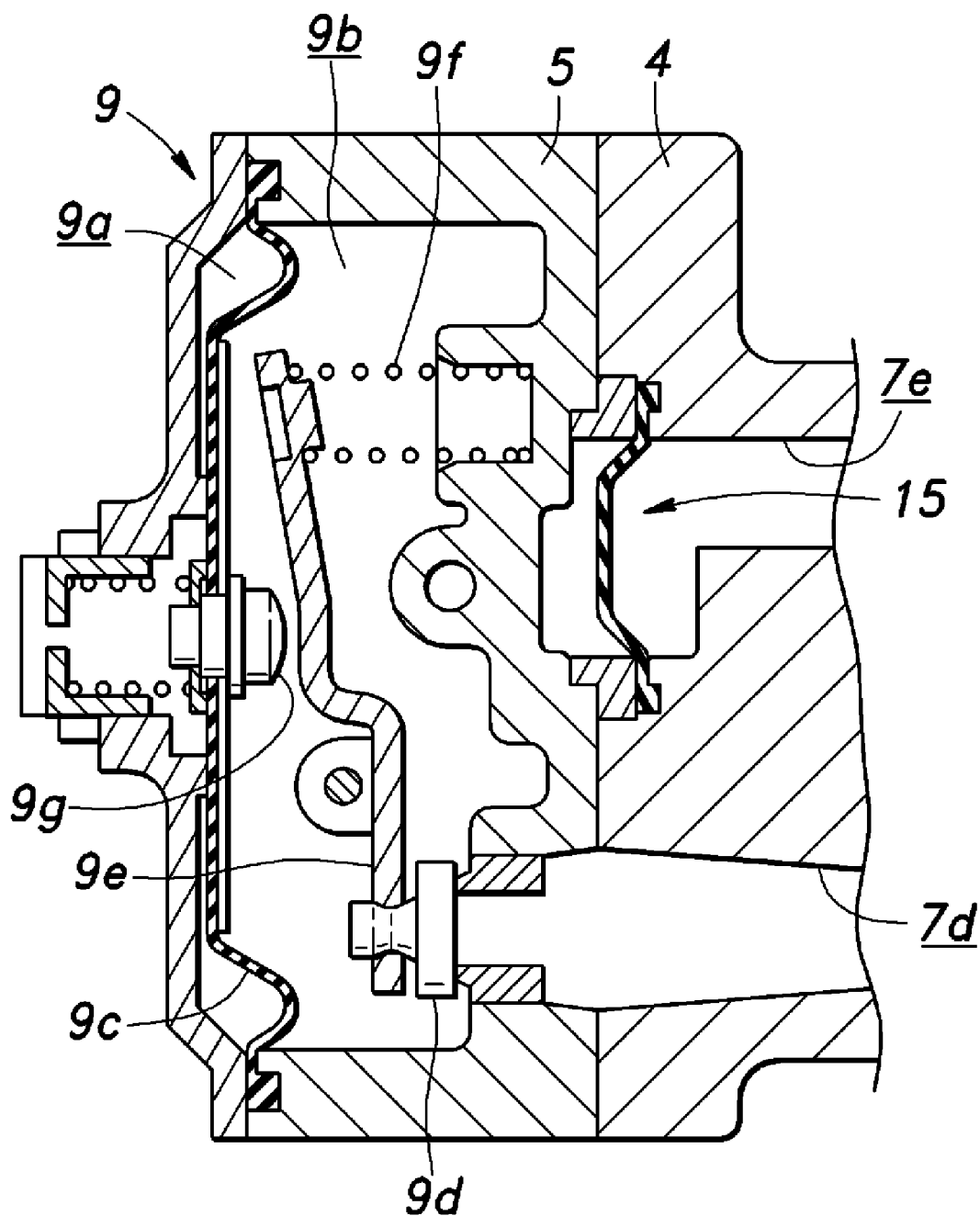
FIG. 5 is a fragmentary sectional view taken along line V-V of FIG. 3.

Referring to FIGS. 3 to 5, a gas flow control valve 9 formed as a diaphragm control valve is provided on the left hand side of the gas flow controller block 5 or the side thereof facing away from the main body 4. The gas flow control valve 9 comprises an atmospheric chamber 9a communicating with the atmosphere, a negative pressure chamber 9b into which an end of the second passage 7d opens via a valve seat 9h, a diaphragm 6c separating the negative pressure chamber 9b from the atmospheric chamber 9a and a valve member 9d configured to selectively close the communication of the second passage 7d with the negative pressure chamber 9b in cooperation with the valve seat 9h.

As best shown in FIG. 5, the valve member 9d is attached to an end of a lever member 9e having a middle part pivotally supported by the gas flow controller block 5. The other end of the lever member 9e is biased by a compression coil spring 9f which is supported by the gas flow controller block 5, and urges the lever member 9e in the direction to cause the valve member 9d to close the communication between the second passage 7d and negative pressure chamber 9b. The diaphragm 9c is centrally provided with a pressure member 9g configured to engage a part of the lever member 9e intermediate between the centrally pivoted part and other end so as to cause the lever member 9e to be pivoted in the direction to open the communication between the second passage 7d and negative pressure chamber 9b against the spring force of the compression coil spring 9f.

Referring to FIGS. 3 and 4, the carburetor incorporated in the main body 4 includes an intake bore 11 extending centrally through the main body 4 and communicating with an intake port of the associated engine not shown in the drawings. The intake bore 11 includes a narrowed middle part into which a free end of a fuel ejection nozzle 12 projects. The other end or base end of the fuel ejection nozzle 12 opens out to the interface between the main body 4 and gas flow controller block 5.

The gas flow controller block 5 is provided with a first metering jet 13 communicating the negative pressure chamber 9b with the base end of the fuel ejection nozzle 12. Therefore, a negative pressure caused by the intake flow in the intake bore 11 is transmitted to the negative pressure chamber 9b, and the level of the negative pressure prevailing in the negative pressure chamber 9b changes in proportion to the intake flow rate in the intake bore 11. The gas flow controller block 5 is additionally provided with a second metering jet 14 extending in parallel with the first metering jet 13 and communicating the base end of the fuel ejection nozzle 12 with a fifth passage 7g formed internally in the wall of the gas flow controller block 5 as will be described hereinafter. A pressure responsive valve 15 is provided in the interface between the main body 4 and gas flow controller block 5 in a spaced relationship to the base end of the fuel ejection nozzle 12.

As best shown in FIG. 3, the pressure responsive valve 15 comprises a pressurization chamber 15a formed in the main body 4, a controlled chamber 15b formed in the gas flow controller block 5 opposite to the pressurization chamber 15a, a diaphragm 15c interposed between the main body 4 and gas flow controller block 5 along the outer periphery thereof and separating the controlled chamber 15b from the pressurization chamber 15a, a valve member 15d retained by a central part of the diaphragm 15c, a valve seat 15e formed in the gas flow controller block 5 and configured to be selectively closed by the valve member 15d and a compression coil spring 15f urging the diaphragm 15c in the direction to move the valve member 15d away from the valve seat 15c.

The pressurization chamber 15a is communicated with the first branch chamber 7b via a third passage 7e. The controlled chamber 15b is communicated with the negative pressure chamber 9b of the gas flow control valve 9 via a fourth passage 7f formed in the wall of the gas flow controller block 5, and with the second metering jet 14 via a fifth passage 7g formed in the wall of the gas flow controller block 5 and communicates with the valve seat 15e at one end thereof and with the second metering jet 14 at the other end (as discussed earlier). In the intake bore 11, a throttle valve member 17 formed as a butterfly valve is provided downstream of the fuel ejection nozzle 12.

Figure 6:
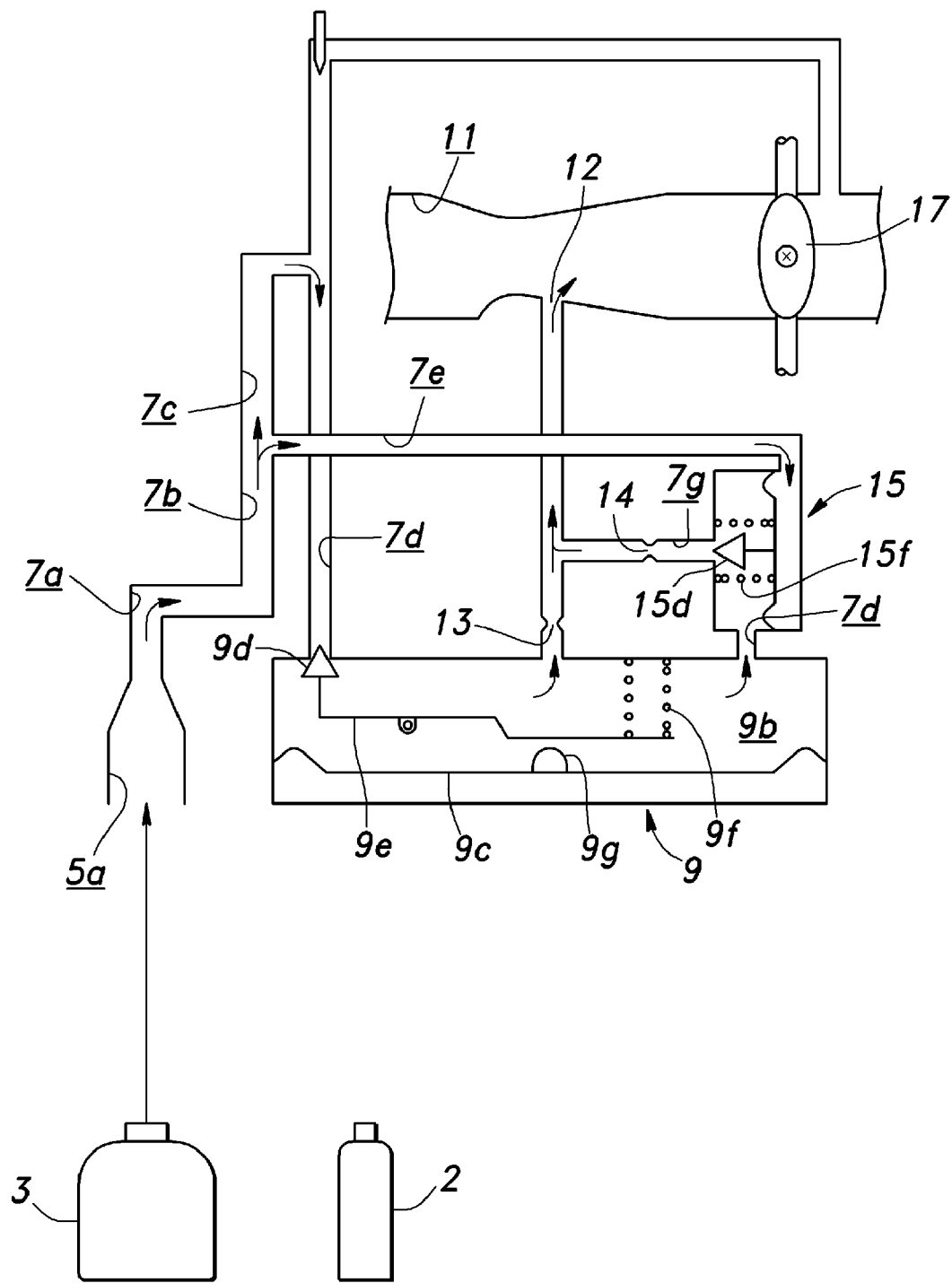
FIG. 6 is a diagram showing the dual gas fuel delivery system when propane gas is being used.

The mode of operation of this system when a propane gas cylinder 3 is connected to the gas fuel inlet 6a for fueling the engine is described in the following with reference to FIG. 6.

The propane gas introduced from the gas fuel inlet 6a is passed through the first passage 7a, and reaches the first branch chamber 7b and then the second branch chamber 7c. The propane gas introduced into the second branch chamber 7c flows into the second passage 7d. The propane gas is supplied at a lower pressure than a pressure at which butane gas would be introduced. The fuel ejection nozzle 12 is typically under negative pressure owing to the high speed air flow in the intake bore 11, and this negative pressure acts upon the negative pressure chamber 9b. This causes the diaphragm 9c to move toward the negative pressure chamber 9b, and the pressure member 9g to press upon the lever member 9e in such a manner that the lever member 9e pivots in the direction to open the gas flow control valve 9. The propane gas that has been introduced into the first branch chamber 7b also flows into the pressurization chamber 15a of the pressure responsive valve 15 via the third passage 7e. The pressure responsive valve 15 is configured to be closed under the high pressure of the butane gas, but to remain open under the low pressure of the propane gas. Therefore, in this case, the pressure responsive valve 15 remains open.

Thus, the propane gas in the negative pressure chamber 9b flows into the fuel ejection nozzle 12 via both the first metering jet 13 and second metering jet 14. The two jets 13 and 14 are designed such that the combined flow of the gas fuel via the two jets 13 and 14 is at an appropriate level when the pressure of the propane gas from the propane gas cylinder 3 is about 2.7 kPa (270 mm aqua).

Figure 7:
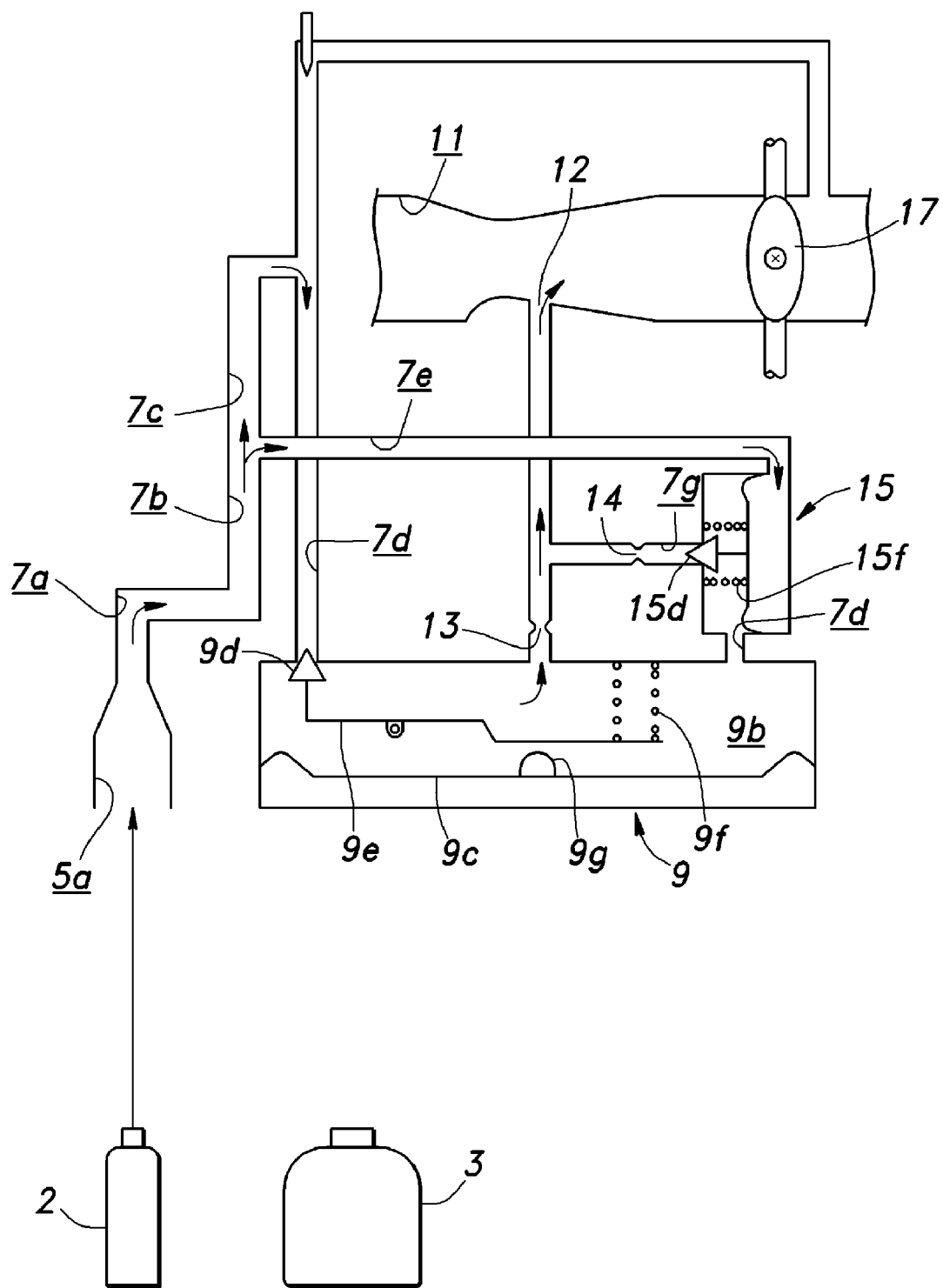
FIG. 7 is a diagram showing the dual gas fuel delivery system when butane gas is being used.

The mode of operation of this system when a butane gas cylinder 2 is connected to the gas fuel inlet 6a for fueling an engine is described in the following with reference to FIG. 7.

In this case also, the butane gas introduced from the gas fuel inlet 6a is passed through the first passage 7a, and reaches the first branch chamber 7b and then the second branch chamber 7c. The butane gas introduced into the second branch chamber 7c flows into the second passage 7d, and the butane gas introduced into the first branch chamber 7b flows into the pressurization chamber 15a of the pressure responsive valve 15 via the third passage 7e. However, butane gas is typically supplied at a higher pressure, for instance at about 5.9 kPa (600 mm aqua), and this pressure is adequate to close the pressure responsive valve 15 against the spring force of the compression coil spring 15f. In other words, the compression coil spring 15f is configured such that the pressure responsive valve 15 closes when butane gas is introduced into the pressurization chamber 15a. Therefore, when butane gas is used, the pressure responsive valve 15 remains closed, and the gas fuel is supplied to the fuel ejection nozzle 12 via the first metering jet 13 only while the passage including the second metering jet 14 is closed.

Thus, the first metering jet 13 is designed so as to meter an appropriate amount of fuel when butane gas is used, and the second metering jet 14 is designed so as to meter an appropriate amount of fuel in cooperation with the first metering jet when propane gas is used.

In the embodiment described above, the pressure responsive valve 15 communicates only the first metering jet for delivering the fuel gas to the carburetor when a gas fuel of a relatively high pressure is used, and communicates both the first and second metering jets for delivering the fuel gas to the carburetor when a gas fuel of a relatively low pressure is used. Therefore, a flow switching valve is not required, and the passage structure can be simplified. Also, the pressure responsive valve 15 is actuated by the pressure of the fuel, and no manual selection is required when a different gas fuel is selected.

If the negative pressure in the fuel ejection nozzle 12 is allowed to act upon the diaphragm 15c of the pressure responsive valve 15, the negative pressure could open the pressure responsive valve 15. However, in the illustrated embodiment, the second metering jet 14 is provided in a downstream part of the passage for the gas fuel, and a communication path is formed between the first metering jet 13 and fuel ejection nozzle 12. Therefore, the negative pressure in the fuel ejection nozzle 12 is reduced by the second metering jet 14, and is prevented from interfering with the diaphragm 15c of the pressure responsive valve 15.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A multiple gas fuel delivery system for interchangeably supplying a plurality of gas fuels having different supply pressures to an internal combustion engine, comprising:
   a gas fuel inlet for receiving a supply of gas fuel;
   a gas flow control valve for metering a gas fuel flow from the gas fuel inlet according to a demand from an engine;
   a fuel ejection nozzle for delivering the fuel metered by the gas flow control valve to the engine;
   a first fuel delivery passage including a first metering jet and extending between the gas flow control valve and the fuel ejection nozzle; and
   a second fuel delivery passage including a second metering jet and a pressure responsive valve and extending between the gas flow control valve and the fuel ejection nozzle in parallel with the first fuel delivery passage, the pressure responsive valve selectively communicating the second fuel delivery passage depending on a pressure of the gas fuel supplied to the gas fuel inlet.

2. The multiple gas flow delivery system according to claim 1, further comprising a carburetor that includes an intake bore into which the fuel injection nozzle projects, and the gas flow control valve comprises an atmospheric chamber, a negative pressure chamber communicating with the fuel ejection nozzle, a diaphragm separating the negative pressure from the atmospheric chamber and a valve member that meters the gas fuel flow by being actuated by the diaphragm.

3. The multiple gas flow delivery system according to claim 2, wherein the pressure responsive valve comprises a pressurizing chamber communicating with the gas fuel inlet, a controlled chamber communicating with the negative pressure chamber of the gas flow control valve and fuel ejection nozzle, a diaphragm separating the controlled chamber from the pressurizing chamber and a valve member that selectively establish communication between the negative pressure chamber of the gas flow control valve and fuel ejection nozzle by being actuated by the diaphragm.

* * * * *